United States Patent
Beere (10) Patent No.: US 9,878,649 B2
(45) Date of Patent: Jan. 30, 2018

(54) HIGH DENSITY FOLDAWAY SHELVING

(71) Applicant: Ranger Design, Montreal (CA)

(72) Inventor: Gary Beere, Pointe-Claire (CA)

(73) Assignee: Ranger Design, Montreal, Quebec (CA)

( * ) Notice: Subject to any disclaimer, the term of this patent is extended or adjusted under 35 U.S.C. 154(b) by 0 days.

(21) Appl. No.: 15/421,733

(22) Filed: Feb. 1, 2017

(65) Prior Publication Data
US 2017/0217348 A1    Aug. 3, 2017

Related U.S. Application Data

(60) Provisional application No. 62/289,520, filed on Feb. 1, 2016.

(51) Int. Cl.
| | |
|---|---|
| *A47F 5/08* | (2006.01) |
| *B60N 3/00* | (2006.01) |
| *A47B 43/00* | (2006.01) |
| *B60R 5/00* | (2006.01) |
| *B60P 7/08* | (2006.01) |
| *B62B 5/04* | (2006.01) |
| *A47B 57/04* | (2006.01) |

(52) U.S. Cl.
CPC .............. *B60N 3/001* (2013.01); *A47B 43/00* (2013.01); *B60P 7/0815* (2013.01); *B60R 5/003* (2013.01); *B62B 5/0495* (2013.01); *A47B 57/04* (2013.01)

(58) Field of Classification Search
CPC ......... B60N 3/001; B60R 5/003; A47B 43/00; A47B 57/04; B60P 7/0815; B62B 5/0495
USPC ......... 211/1.51, 121, 187, 90.01, 90.02, 144, 211/150; 108/99, 100, 134, 135, 136, 108/152; 296/3, 181.1, 182.1, 24.44, 296/24.45; 248/242
See application file for complete search history.

(56) References Cited

U.S. PATENT DOCUMENTS

| | | | | |
|---|---|---|---|---|
| 763,061 | A * | 6/1904 | Keil ..................... | A47B 57/045 174/161 R |
| 1,116,091 | A * | 11/1914 | McDonald ........... | A47B 57/567 108/134 |
| 1,176,588 | A * | 3/1916 | Deckert ............... | A47B 96/027 248/250 |
| 1,204,286 | A * | 11/1916 | Lengquist .......... | A47B 21/0314 108/100 |
| 1,259,532 | A * | 3/1918 | Leach .................... | A47B 61/00 108/134 |
| 1,324,537 | A * | 12/1919 | Belcher ................. | A47B 57/42 108/108 |
| 1,402,929 | A * | 1/1922 | Herpst .................. | A47B 43/00 108/116 |

(Continued)

Primary Examiner — Joshua J Michener
Assistant Examiner — Devin Barnett
(74) Attorney, Agent, or Firm — William H. Honaker; Dickinson Wright PLLC (57) ABSTRACT

The high density foldaway shelving unit of the present invention includes at least one shelf and at least two spaced posts. The shelf is mounted between the posts. A pair of cantilevered floor mounts is mounted to the floor of a vehicle. Each of the posts is mounted to a respective one of the cantilevered floor mounts to transfer weight to the cantilevered floor mounts. A pre-assembled shelf mounting assembly is provided for mounting the shelves to the posts. The pre-assembled shelf mounting assembly has a bracket mounted to the posts, a pivot pin mounted to the shelf and a guide pin for stopping the shelf in the raised and lowered position.

13 Claims, 6 Drawing Sheets

(56) References Cited

U.S. PATENT DOCUMENTS

| | | | | |
|---|---|---|---|---|
| 1,580,289 A * | 4/1926 | Cummings | A47B 5/04 | 108/134 |
| 1,630,889 A * | 5/1927 | Clarke | A47B 46/005 | 108/135 |
| 1,667,657 A * | 4/1928 | Dobert | A47B 5/04 | 108/134 |
| 1,724,196 A * | 8/1929 | Harrison | B22C 9/12 | 198/797 |
| 1,759,800 A * | 5/1930 | Noack | A47C 9/06 | 108/100 |
| 1,880,621 A * | 10/1932 | Willetts | A47B 5/02 | 108/134 |
| 1,925,523 A * | 9/1933 | Cuff | A47B 31/06 | 108/135 |
| 2,199,981 A * | 5/1940 | Bell | A47B 5/04 | 108/134 |
| 2,483,899 A * | 10/1949 | Grasso | A47B 5/04 | 108/134 |
| 2,498,428 A * | 2/1950 | Kruse | A47B 5/04 | 108/135 |
| 2,509,546 A * | 5/1950 | Welk | G06K 21/04 | 108/134 |
| 2,670,091 A * | 2/1954 | Sinks | B65G 65/00 | 414/414 |
| 2,735,737 A * | 2/1956 | Hancock | A47D 5/003 | 108/134 |
| 2,741,521 A * | 4/1956 | Bell | B60N 3/004 | 108/135 |
| 2,774,640 A * | 12/1956 | Harmon | B60N 3/004 | 108/134 |
| 2,792,053 A * | 5/1957 | Kursman | A47K 3/122 | 108/134 |
| 2,824,599 A * | 2/1958 | Quinlan | A47C 7/70 | 108/134 |
| 2,833,420 A * | 5/1958 | Streater | A47B 57/42 | 108/135 |
| 2,912,118 A * | 11/1959 | Behrens | A47B 63/067 | 211/121 |
| 2,932,544 A * | 4/1960 | Lambert | B60N 3/004 | 108/135 |
| 2,943,896 A * | 7/1960 | Gaston | A47B 5/04 | 108/134 |
| 3,050,355 A * | 8/1962 | Hess | B60N 3/004 | 108/135 |
| 3,123,024 A * | 3/1964 | Bronson | B65G 1/07 | 108/136 |
| 3,151,576 A * | 10/1964 | Patterson | A47F 5/0087 | 108/152 |
| 3,186,783 A * | 6/1965 | Graber | A47B 63/067 | 198/793 |
| 3,187,880 A * | 6/1965 | Frater | B65G 17/123 | 198/798 |
| 3,199,658 A * | 8/1965 | Graber | A47B 63/067 | 198/800 |
| 3,421,458 A * | 1/1969 | Nusbaum | A47B 1/04 | 108/134 |
| 3,426,993 A * | 2/1969 | Johansson | A47B 57/045 | 211/135 |
| 3,455,530 A * | 7/1969 | Lytwynka | A47B 77/10 | 108/134 |
| 3,561,713 A * | 2/1971 | Berkowitz | A47B 57/045 | 108/6 |
| 3,680,710 A * | 8/1972 | Hager | B62B 3/006 | 108/2 |
| 3,720,451 A * | 3/1973 | Anders | B65G 1/127 | 198/798 |
| 3,795,379 A * | 3/1974 | Gray | A47B 57/045 | 248/242 |
| 4,029,355 A * | 6/1977 | Wilhelmsen | B62D 33/0273 | 108/134 |
| 4,357,881 A * | 11/1982 | De Long | A47B 23/02 | 108/135 |
| 4,575,149 A * | 3/1986 | Forestal | A47B 23/02 | 108/135 |
| 4,605,131 A * | 8/1986 | Debus | A47B 5/04 | 108/134 |
| 4,621,745 A * | 11/1986 | Grace | B65G 1/08 | 193/40 |
| 4,688,681 A * | 8/1987 | Bergeron | A47B 61/04 | 211/150 |
| D294,221 S * | 2/1988 | Sheftel | | 248/242 |
| 4,770,107 A * | 9/1988 | Miller | B60N 3/004 | 108/135 |
| 4,850,285 A * | 7/1989 | Suttles | A47F 5/103 | 108/108 |
| 4,854,628 A * | 8/1989 | Halberg | B60P 1/00 | 280/756 |
| 4,934,645 A * | 6/1990 | Breslow | A47B 57/045 | 108/108 |
| 5,088,607 A * | 2/1992 | Risafi | A47B 57/42 | 211/187 |
| 5,111,963 A * | 5/1992 | Grace, Sr. | B65G 1/08 | 193/27 |
| 5,117,986 A * | 6/1992 | Lin | A47B 57/20 | 108/2 |
| 5,236,104 A * | 8/1993 | Stingel, Jr. | B65G 11/086 | 193/27 |
| 5,524,747 A * | 6/1996 | Wohlfahrt | B65G 59/023 | 198/512 |
| 5,566,836 A * | 10/1996 | Lerman | H05K 7/186 | 211/189 |
| 5,566,844 A * | 10/1996 | Bernardin | A47F 5/0846 | 211/162 |
| 5,655,459 A * | 8/1997 | O'Connor | A47B 5/06 | 108/134 |
| 5,695,072 A * | 12/1997 | Terragni | A47G 25/0685 | 211/1.51 |
| 5,749,480 A * | 5/1998 | Wood | A47B 57/04 | 211/150 |
| 5,779,094 A * | 7/1998 | Stingel, Jr. | B65G 1/08 | 221/2 |
| 5,797,501 A * | 8/1998 | Von Gunten | A47B 57/42 | 108/180 |
| 6,082,690 A * | 7/2000 | Durin | H02G 3/263 | 211/90.01 |
| 6,164,467 A * | 12/2000 | DePottey | A47F 5/0846 | 211/189 |
| 6,202,570 B1 * | 3/2001 | Kurtsman | H02B 1/34 | 108/108 |
| 6,220,463 B1 * | 4/2001 | Pullen | A47B 57/045 | 211/186 |
| 6,302,282 B1 * | 10/2001 | Gay | A47B 57/045 | 108/152 |
| 6,837,467 B2 * | 1/2005 | Cheng | A47B 46/005 | 108/108 |
| 7,121,104 B2 * | 10/2006 | Howington | A47B 57/045 | 248/242 |
| 7,337,730 B2 * | 3/2008 | Bienick | A47B 57/48 | 108/108 |
| 7,338,110 B1 * | 3/2008 | Eckloff | B60R 11/00 | 296/182.1 |
| 8,038,021 B2 * | 10/2011 | Chen | A47B 46/005 | 211/187 |
| 8,075,033 B1 * | 12/2011 | McElroy | B60P 1/433 | 119/406 |
| 8,079,553 B1 * | 12/2011 | Martin | A47C 7/543 | 108/135 |
| 8,333,448 B2 * | 12/2012 | Yoon | A47B 96/028 | 108/108 |
| 8,584,601 B1 * | 11/2013 | Deschner | B25H 1/04 | 108/134 |
| 8,960,612 B2 * | 2/2015 | McCoy | F16L 3/223 | 211/193 |
| 9,247,810 B2 * | 2/2016 | Metzler | A47B 57/045 | |
| 9,260,046 B2 * | 2/2016 | Mowry | A47B 46/005 | |
| 9,546,021 B2 * | 1/2017 | Stover | B65G 1/04 | |
| 2002/0158490 A1 * | 10/2002 | Hutzel | B60J 1/085 | 296/193.04 |

(56) References Cited

U.S. PATENT DOCUMENTS

| | | | |
|---|---|---|---|
| 2003/0034356 A1* | 2/2003 | Freudelsperger | B65G 1/1376 221/289 |
| 2003/0106475 A1* | 6/2003 | Chen | A47B 5/006 108/134 |
| 2003/0127482 A1* | 7/2003 | Gort | B60P 3/14 224/549 |
| 2004/0011755 A1* | 1/2004 | Wood | A47B 91/00 211/189 |
| 2005/0211140 A1* | 9/2005 | McDonald, II | A47B 57/20 108/108 |
| 2006/0033359 A1* | 2/2006 | Taylor | B60P 3/14 296/182.1 |
| 2006/0033360 A1* | 2/2006 | Taylor | B60P 1/00 296/186.1 |
| 2007/0069542 A1* | 3/2007 | Steiger | B60P 3/14 296/24.44 |
| 2007/0241072 A1* | 10/2007 | Bryant | A47B 96/021 211/90.02 |
| 2008/0012372 A1* | 1/2008 | Squyres | B60P 1/00 296/24.44 |
| 2008/0048081 A1* | 2/2008 | Costa | A47B 57/00 248/241 |
| 2008/0314850 A1* | 12/2008 | Haarmann | A47B 57/567 211/90.02 |
| 2009/0173705 A1* | 7/2009 | Stingel, III | B65G 1/026 211/150 |
| 2010/0066114 A1* | 3/2010 | Winget | B60R 21/026 296/24.43 |
| 2010/0258692 A1* | 10/2010 | Kluge | A47B 96/1466 248/250 |
| 2010/0326936 A1* | 12/2010 | Hanley | A47B 81/00 211/86.01 |
| 2011/0127790 A1* | 6/2011 | Mokhtari | B60P 3/42 296/3 |
| 2012/0126561 A1* | 5/2012 | Pencak | B62D 25/2054 296/24.3 |
| 2014/0252057 A1* | 9/2014 | Workman | B60P 3/14 224/557 |
| 2014/0263128 A1* | 9/2014 | Garrett | A47F 5/0087 211/144 |
| 2014/0354001 A1* | 12/2014 | Hanley | B60R 7/08 296/24.44 |
| 2015/0096950 A1* | 4/2015 | Engel | A47B 46/00 211/90.02 |
| 2015/0335155 A1* | 11/2015 | Winker | A47B 87/005 211/90.02 |
| 2015/0366338 A1* | 12/2015 | Conod | A47B 47/0083 108/48 |
| 2016/0007740 A1* | 1/2016 | Consaul | B65D 19/40 211/187 |
| 2016/0189087 A1* | 6/2016 | Morton | G06Q 10/083 705/337 |
| 2017/0048992 A1* | 2/2017 | Katsaros | H05K 7/1411 |
| 2017/0096294 A1* | 4/2017 | Johnson | B65D 90/0066 |
| 2017/0143116 A1* | 5/2017 | Ueda | A47B 57/04 |
| 2017/0217358 A1* | 8/2017 | Paunov | A47B 43/00 |

* cited by examiner

HIGH DENSITY FOLDAWAY SHELVING

RELATED APPLICATIONS

This application claims the benefit of U.S. Provisional Application No. 62/289,520 filed on Feb. 1, 2016, the entire disclosure of the application being considered part of the disclosure of this application and hereby incorporated by reference.

STATEMENT REGARDING FEDERALLY SPONSORED RESEARCH

None.

TECHNICAL FIELD

The present invention generally relates to foldaway shelving for motor vehicles. More specifically the present invention relates to high density foldaway shelving for motor vehicles.

BACKGROUND OF THE INVENTION

Various types of product storage, such as shelving, bin shelving, foldaway shelving and drawer systems are known for cargo vans, cube vans, transit vehicles, etc.

Foldaway shelving for vehicles is common. Foldaway vehicle shelving is provided in various sizes and for various purposes. The common benefit of foldaway shelving is that it can be folded down to support items, and folded up out of the way when not being used. However, foldaway shelving has weight limits that sometimes limit their use for supporting heavier items.

It is desirable to provide high density foldaway shelving for cargo vans, cube vans, transit vehicles, etc. It is also desirable to provide high density foldaway shelving that is still relatively lightweight and cost effective. It is also desirable to provide shelving that is easy to assemble.

SUMMARY OF THE INVENTION

In general terms, this invention provides a high density foldaway shelving unit for mounting within a vehicle which is relatively lightweight, cost effective and easy to assemble.

The high density foldaway shelving unit of the present invention includes at least one shelf and at least two spaced posts. The shelf is mounted between the posts.

A pair of cantilevered floor mounts is mounted to the floor of a vehicle. Each of the posts is mounted to a respective one of the cantilevered floor mounts to transfer weight to the cantilevered floor mounts.

A pre-assembled shelf mounting assembly is provided for mounting the shelves to the posts. The pre-assembled shelf mounting assembly has a bracket mounted to the posts, a pivot pin mounted to the shelf and a guide pin for stopping the shelf in the raised and lowered position.

In the disclosed embodiment, a gas cylinder is provided to assist in the raising and lowering of the shelf. The gas cylinder includes opposed ends and the bracket includes a raised portion to receive one end of the opposed ends with the other opposed end being mounted to the shelf. The raised portion maintains the gas cylinder closing adjacent to the shelf.

An anti-pinch guard is mounted adjacent the pivot pin and guide pin. The anti-pinch guard is a plate affixed to the shelf by the pivot pin and the guide pin.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
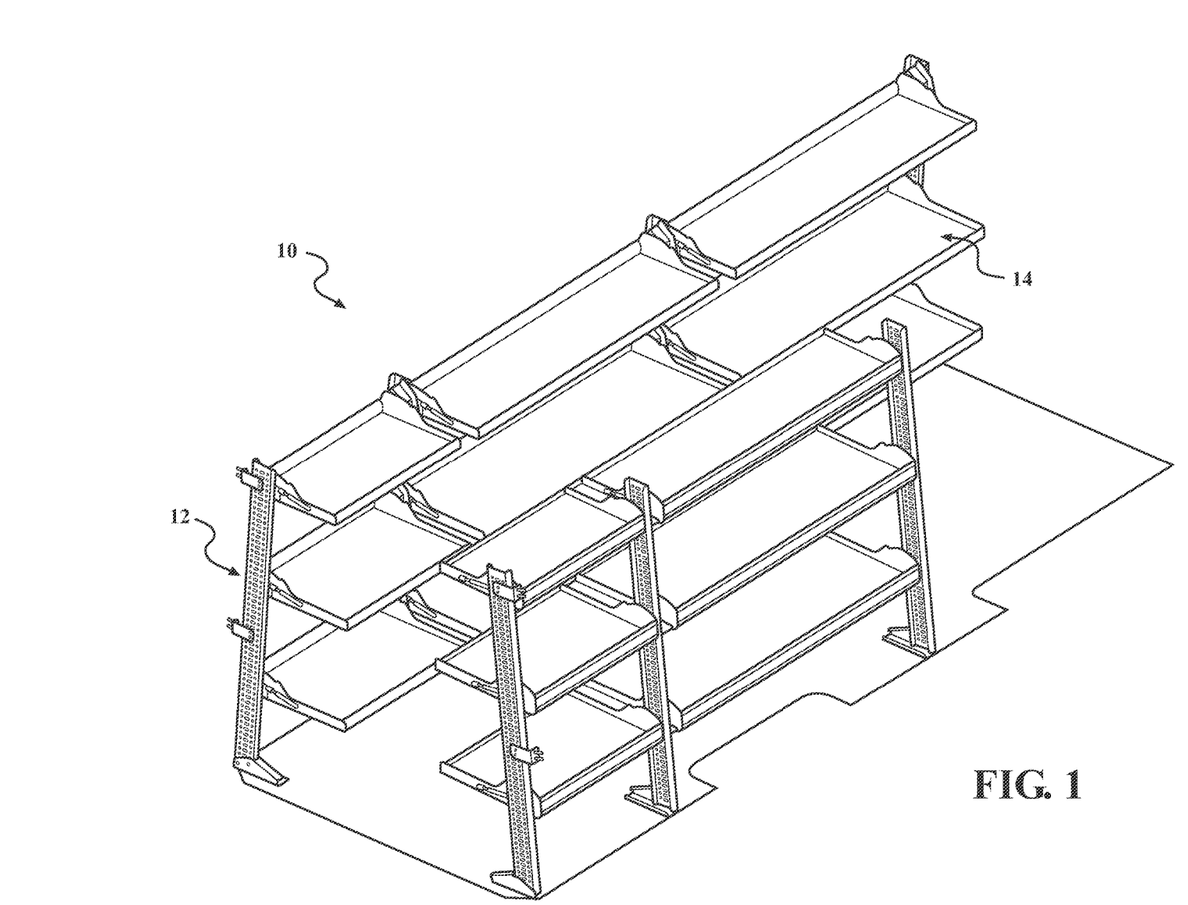
FIG. 1 is a perspective view of the high density foldaway shelving of the present invention.
Figure 2:
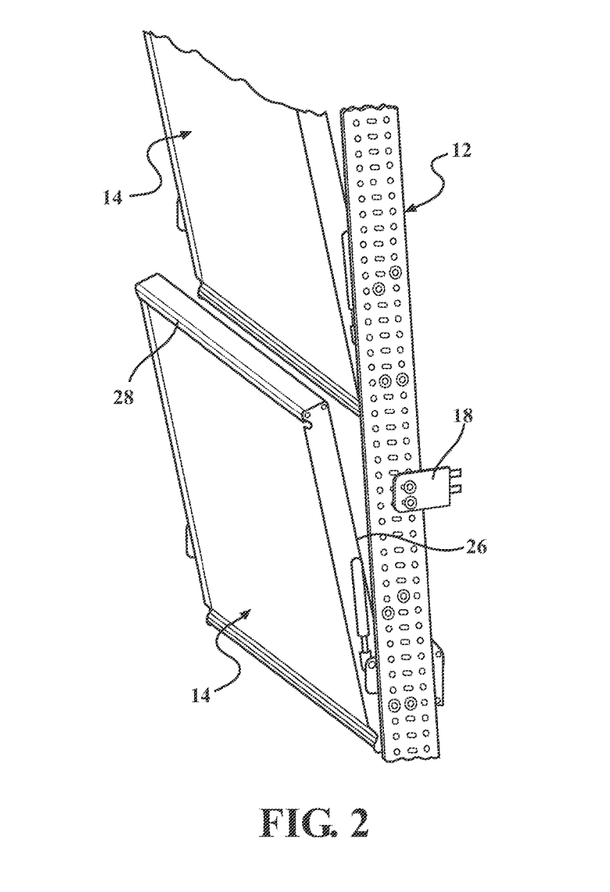
FIG. 2 is a partial perspective view of the high density foldaway shelving of the present invention.
Figure 3:
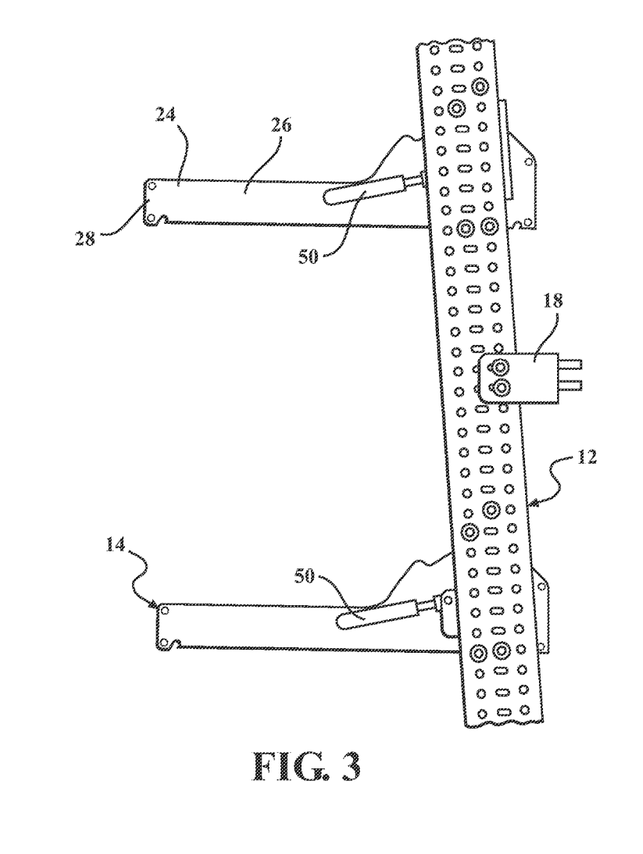
FIG. 3 is a partial side view of the high density foldaway shelving of the present invention.
Figure 10:
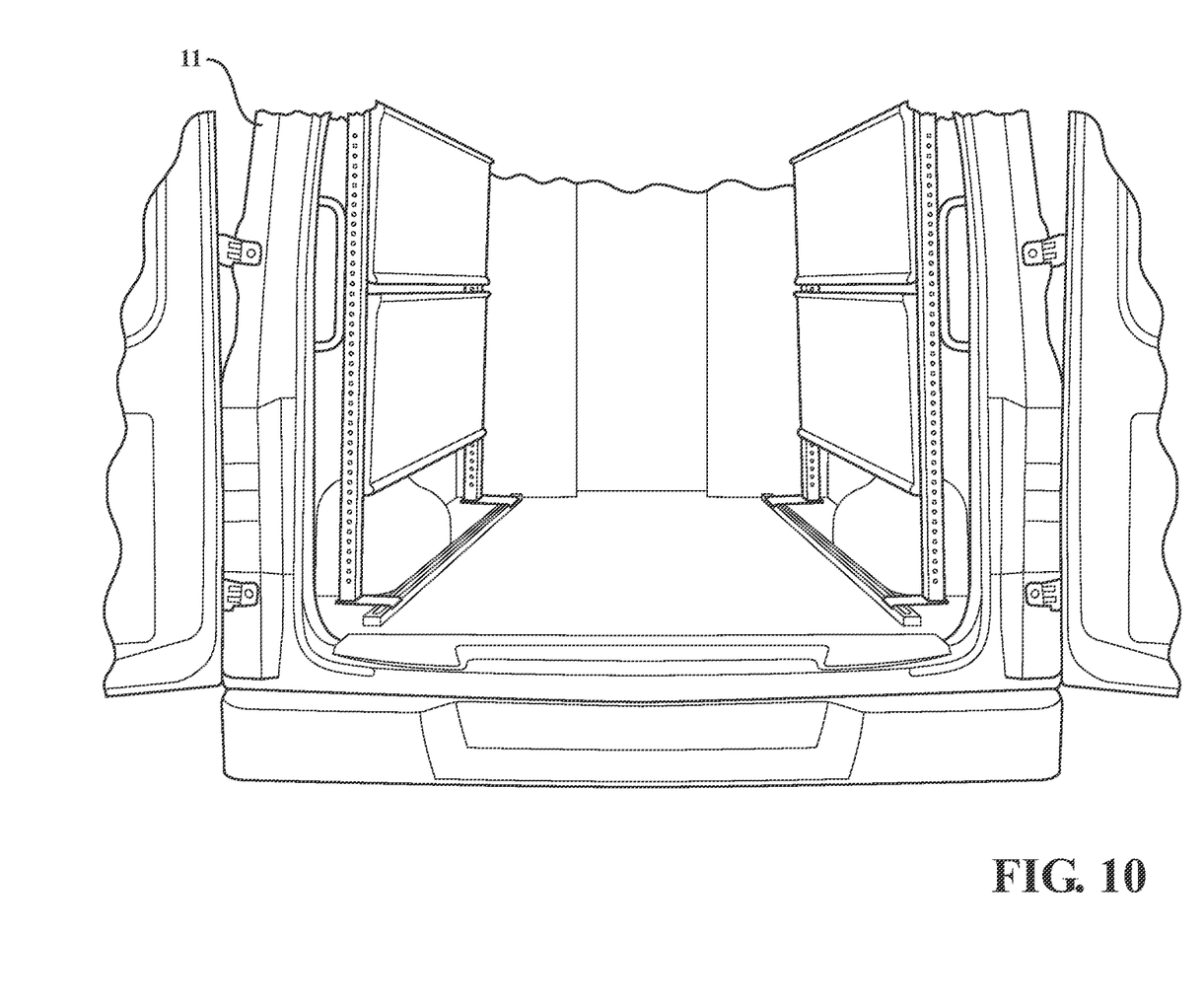
FIG. 10 is an illustration of a vehicle to which the high density foldaway shelving of the present invention is mounted.

The present invention is generally shown at 10 in FIG. 1. The high density foldaway shelving 10 has posts 12 for supporting the shelves 14 within a vehicle, such as vehicle 11 shown in FIG. 10.

Figure 4:
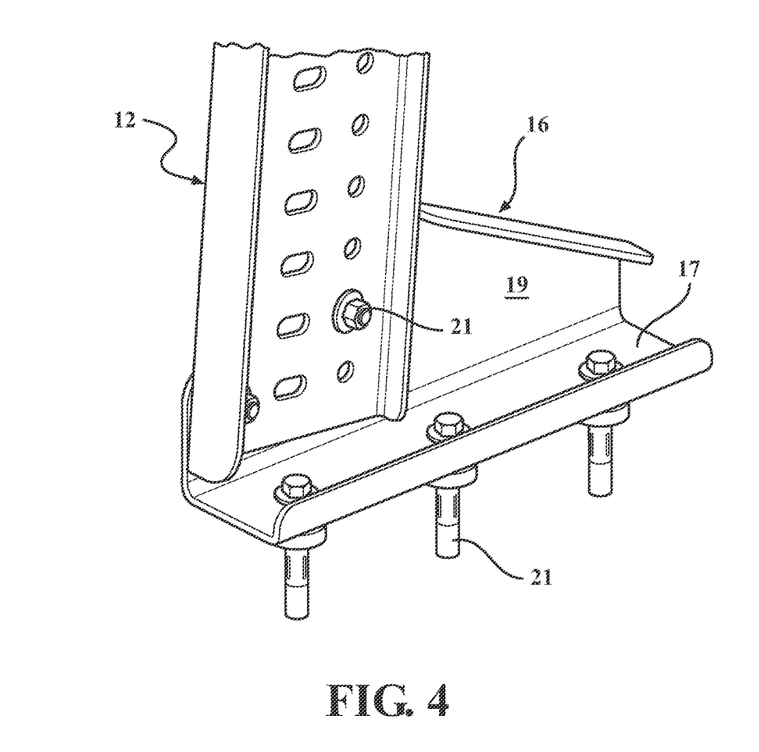
FIG. 4 is a partial perspective view of the cantilever foot mount of the high density foldaway shelving of the present invention.
Figure 5:
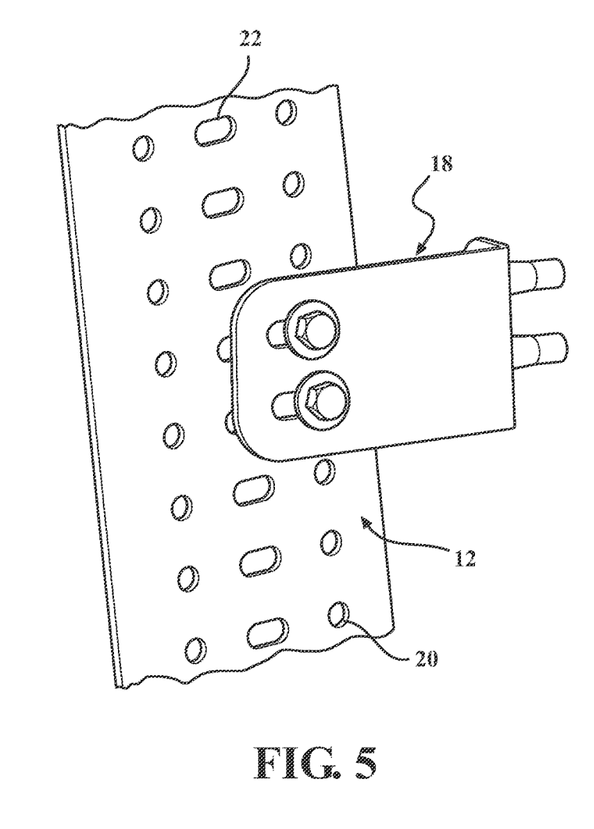
FIG. 5 is a partial perspective view of the post and bracket of the high density foldaway shelving of the present invention.

With reference to FIGS. 4 and 5, the posts 12 are mounted to the floor of the vehicle with cantilevered feet 16. In the disclosed embodiment, a separate foot 16 is provided for each post 12. Side mount brackets 18 connect the posts 12 to the interior walls of the vehicle. As will be appreciated, the use of cantilevered feet 16 transfers the weight on the shelves 14 from the vehicle walls to the vehicle floor.

In the disclosed embodiment, the cantilevered foot 16 has a base 17 and a partial angled wall 19. The partial angled wall 19 engages and supports the lower end of the post 12. Fasteners 21 are used to mount the cantilevered foot 16 to the floor of the vehicle and to mount the post 12 to the cantilevered foot 16. The outer edges of the base 17 and partial angled wall 19 are rolled or bent to provide additional strength.

The posts 12 are mounted to the interior side walls of the vehicle 11. Brackets 18 are disclosed. The brackets 18 are mounted to the posts 12 through either the holes 20 or slots 22. The holes and slots allow for easy mounting in a variety of vehicles and allow for the angle of the cantilevered posts 12.

The shelves 24 of the disclosed embodiment have a support surface 24, opposed sidewalls 26, a front wall 28 and rear wall 30. With reference to FIGS. 6 through 9, the shelves 24 are mounted to the posts 12 by pre-assembled shelf mounting assemblies 32. The pre-assembled shelf mounting assemblies 32 make assembly of the foldaway shelves 10 of the present invention fast and easy. Only two connectors, pivot pin 40 and guide 42 are needed to mount the pre-assembled shelf mounting assemblies 32 to the shelf 24. In the preferred embodiment, the pre-assembled shelf mounting assembly 32 is mounted to each side wall 26 of each shelf 24. This allows the shelves 24 to be mounted between the posts 12 by the use of four bolts 35 as disclosed. It should be understood that less or more bolts 35 could be used.

Figure 6:
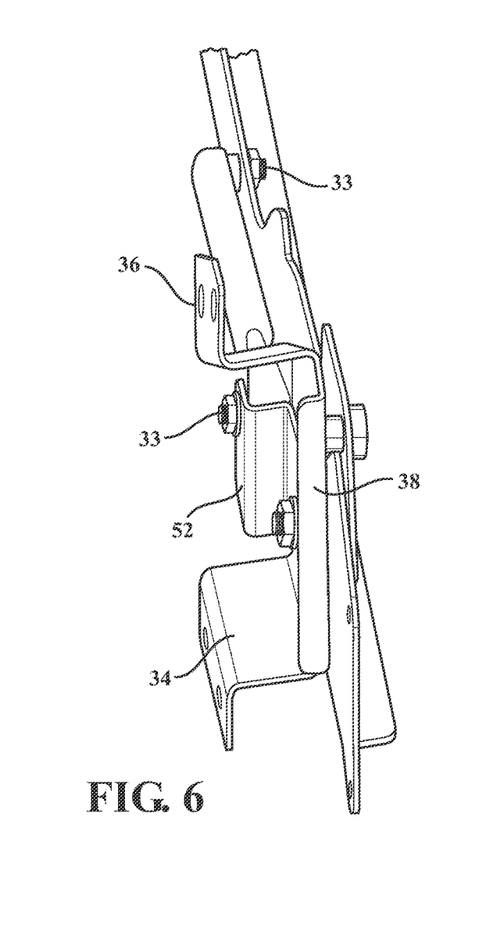
FIG. 6 is a perspective view of the pre-assembled shelf mounting assembly of the high density foldaway shelving of the present invention.
Figure 7:
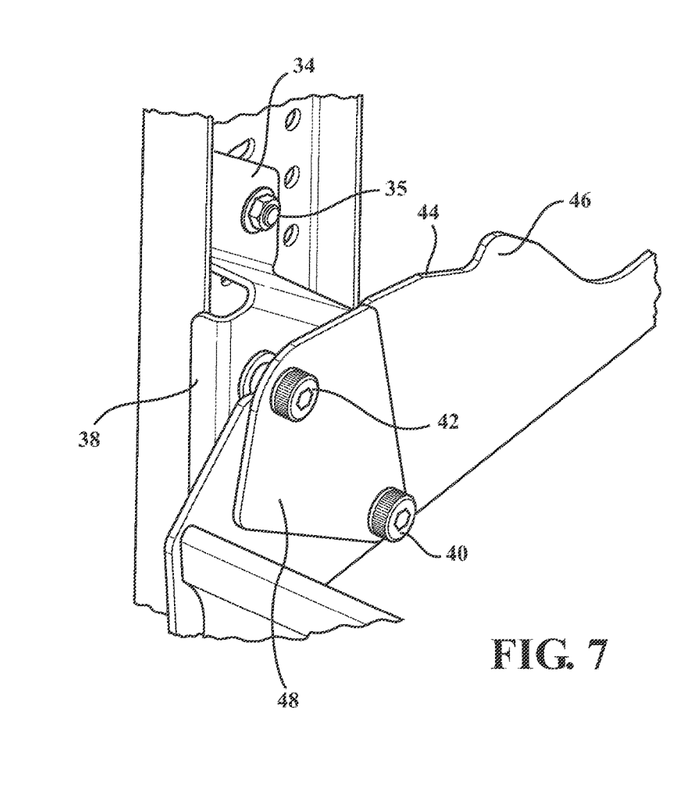
FIG. 7 is a partial perspective view of post and shelf of the high density foldaway shelving of the present invention.
Figure 8:
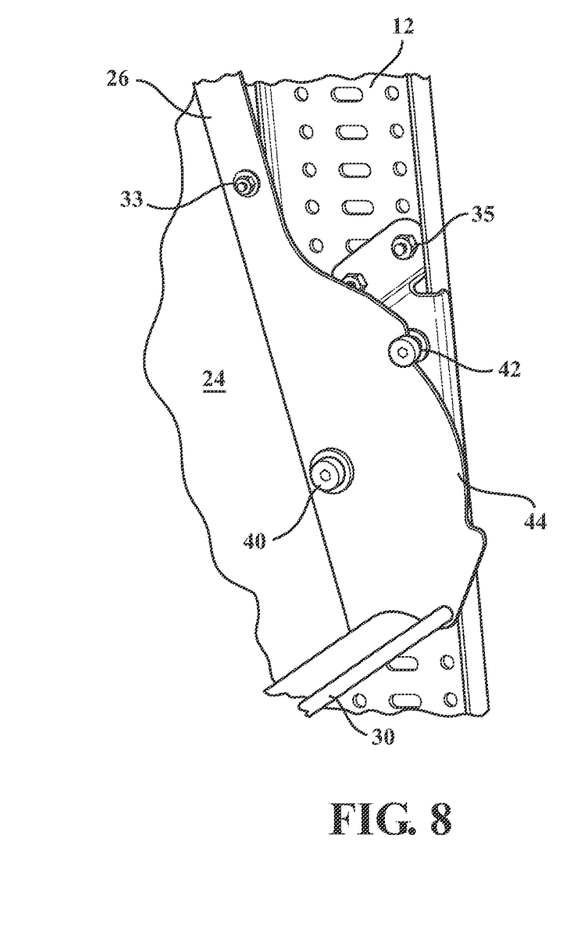
FIG. 8 is a partial perspective view of the high density foldaway shelving of the present invention with the shelf in the raised position.
Figure 9:
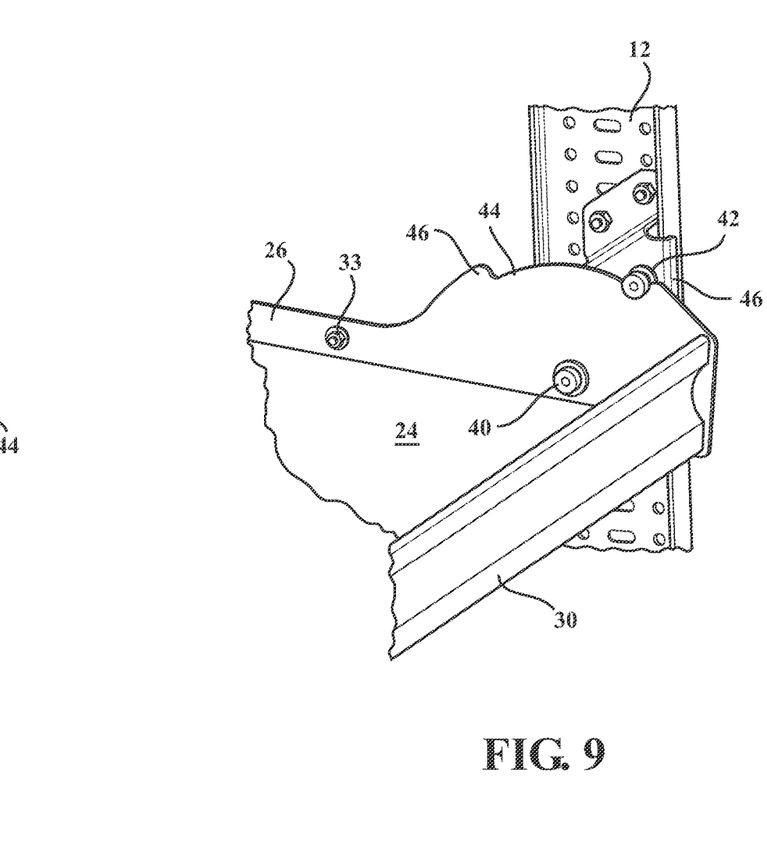
FIG. 9 is a partial perspective view of the high density foldaway shelving of the present invention with the shelf in the lowered position.

The pre-assembled shelf mounting assemblies 32 of the present invention include a generally u-shaped connection mount or shelf bracket 34. The shelf bracket 34 has a rolled or bent lip 38 that engages the post 12 to facilitate mounting and to provide strengthened support to the pre-assembled shelf mounting assemblies 32. The lip 38 transfers force to the post 12.

A pivot pin 40 and guide 42 connect the shelf to the bracket 34. Guide pin 42 rides along the profile 44 formed in the side walls 26. The profile includes raised surfaces 46 to stop the shelf in the fully raised position and the fully lowered position. An anti-pinch guard 48 covers the guide pin 42 to prevent pinching.

In the disclosed embodiment, a gas shock 50 is provided to assist in the raising and lowering of the shelf 14. The bracket 34 includes a raised portion 52 for mounting one end of the shock 50 to the bracket 34. Fasteners 33 mount the gas shock 50 to the raised portion 52 and the shelf 14 at the sidewall 26. The raised portion 52 allows the gas shock 50 to be mounted closely to the sidewall 26 to conserve space. In the disclosed embodiment, there are gas shocks 50 mounted to each sidewall 26. It will be understood that only one gas shock 50 could be used on a shelf if desired, or even no gas cylinders.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A high density foldaway shelving unit for mounting within a vehicle, said high density foldaway shelving unit comprising:
    at least one shelf having a bottom and opposed side walls extending upwardly perpendicular from said bottom, each of said opposed side walls having an inner surface and an outer surface, a front edge, a rear edge, and a top edge;
    at least two spaced posts, said at least one shelf being mounted between said at least two posts; a pair of cantilevered floor mounts adapted to be mounted to the floor of a vehicle, each of said posts being mounted to a respective one of said cantilevered floor mounts to transfer weight to said cantilevered floor mounts;
    a pair of shelf brackets, each of said shelf brackets positioned adjacent a respective one of said outer surfaces of each of said side walls;
    a pair of pivot pins, wherein each pin extends through a respective one of said side walls and said shelf brackets, said at least one shelf pivoting about said shelf brackets via said pivot pins;
    a pair of guide pins spaced from said pivot pins, wherein each guide pin protrudes from one of said pair of shelf brackets, each guide pin engaging and gliding along a respective one of the top edges of said side walls as said at least one shelf rotates from a fully raised position to a fully lowered position along an uninterrupted arcuate path of engagement, said top edges of said side walls being arcuate in shaped and free from any slots therein along said uninterrupted arcuate path of engagement.

2. The high density foldaway shelving unit of claim 1, wherein said at least one shelf includes a gas cylinder to assist in the raising and lowering the shelf.

3. The high density foldaway shelving unit of claim 2, wherein each gas cylinder includes opposed ends and at least one of said shelf brackets includes a raised portion to receive one end of said opposed ends with said other opposed end being mounted to said at least one shelf, wherein a corresponding raised portion maintains a respective gas cylinder closely adjacent said at least one shelf.

4. The high density foldaway shelving unit of claim 1, further including an anti-pinch guard mounted adjacent a corresponding pivot pin and a corresponding guide pin.

5. The high density foldaway shelving unit of claim 4, wherein said anti-pinch guard is a plate affixed to said at least one shelf by said corresponding pivot pin and said corresponding guide pin.

6. The high density foldaway shelving unit of claim 1, wherein said pair of shelf brackets each includes a lip for facilitating mounting of said pair of shelf brackets to the respective posts and for distributing weight from said at least one shelf to said respective posts.

7. The high density foldaway shelving unit of claim 1, wherein said path of engagement includes a profile with at least one raised portion, each guide pin engaging a respective raised portion to hold said at least one shelf in position.

8. The high density foldaway shelving unit of claim 1, wherein each posts include a plurality of openings for receipt of fasteners.

9. The high density foldaway shelving unit of claim 1, wherein each cantilevered floor mount includes a base and a partial angled wall, said partial angled wall engages and supports a lower end of one of said at least two spaced posts.

10. A pre-assembled shelf mounting assembly for mounting a foldaway shelf, said pre-assembled shelf mounting assembly comprising:
    a shelf having a bottom and first and second side walls extending upwardly perpendicular from the bottom, said first and second side walls each having an inner surface, an outer surface, a front edge, a rear edge, and a top edge;
    at least one shelf bracket said at least one shelf bracket positioned adjacent said outer surface of said first side wall, said at least one bracket configured to be affixed to an inner surface of a support post;
    at least one pivot pin extending through said first side wall and said at least one shelf bracket, said shelf pivoting about said at least one shelf bracket via said at least one pivot pin;
    at least one guide pin spaced from said at least one pivot pin, said at least one guide pin protruding from said at least one bracket, said at least one guide pin engaging and gliding along the top edge of said first side wall as said shelf rotates from a fully raised position to a fully lowered position along an uninterrupted arcuate path of engagement, said top edge of said first side wall being arcuate in shaped and free from any slots therein along said uninterrupted arcuate path of engagement.

11. The pre-assembled shelf mounting assembly of claim 10, wherein said assembly includes a gas shock mounted to said at least one bracket and said shelf.

12. The pre-assembled shelf mounting assembly of claim 10, further including a pinch guard.

13. The pre-assembled shelf mounting assembly of claim 10, further including a pinch guard positioned adjacent said inner surface of said first side wall.

\* \* \* \* \*